3,012,897
PROCESS OF PRODUCING DEHYDRATED MASHED POTATOES

John F. Sullivan, Drexel Hill, and James Cording, Jr., Philadelphia, Pa., and Miles J. Willard, Jr., Idaho Falls, Idaho, assignors to the United States of America as represented by the Secretary of Agriculture
No Drawing. Filed Feb. 3, 1959, Ser. No. 790,983
1 Claim. (Cl. 99—207)
(Granted under Title 35, U.S. Code (1952), sec. 266)

A non-exclusive, irrevocable, royalty-free license in the invention herein described, throughout the world for all purposes of the United States Government, with the power to grant sublicenses for such purpose, is hereby granted to the Government of the United States of America.

This invention relates to dehydrated cooked mashed potatoes.

In a previously described procedure for the dehydration of cooked mashed potato, U.S. Patent No. 2,780,552, a stable product was obtained which upon reconstitution yielded a mashed potato having substantially the color, flavor and consistency of fresh mashed potato. In that procedure a prerequisite for a dehydrated product which reconstituted to a high quality, mealy mashed potato was the use of high-solids potatoes. Much of the regular potato crop gives a fresh, mashed potato which is, in varying degrees, pasty or gummy and sometimes lumpy. Such potatoes are usually characterized as low solids potatoes. Subsequently, as disclosed in U.S. Patent No. 2,787,553, the inclusion of a precooking step embodying holding at 140–180° F. for ten to sixty minutes prior to cooking at about 212° F., improved the texture of the cooked potato and made possible the use for preparation of dehydrated mashed potato from potatoes classified as low-solids potatoes. Even with the improved process, however, some potatoes, because of their extremely low-solids content gave a dehydrated product which upon reconstitution yielded a mashed potato which was considered unacceptable.

Another consideration in present production of potato flakes is the package-density of the product. When the thin continuous sheet off the drying drum is broken into flakes, cleavage occurs not only between the cells, but through them as well. Cleaving the cells releases free starch. The smaller the flakes are made, the greater the ratio of number of broken peripheral cells to the total number of cells per flake, and a flake size is eventually reached where a difference in texture can be detected. It is desirable for certain packages (as for institutional use) that the present flake size (about ¼" to ½" square) be reduced so that the greatest possible weight of product may be packaged in any given size container.

An object of this invention is the production of dehydrated mashed potatoes which upon reconstitution yield mashed potato having appearance and flavor substantially the same as, and a texture (increased mealiness) which is markedly superior to mashed potato from fresh-cooked low-solids potatoes. Another object is to improve the physical characteristics of the dehydrated mashed potato product so that the extent of cutting and fracturing the sheet of dehydrated potato has less effect upon the quality of the reconstituted product, thus making it possible to decrease the size of the flake.

Although dehydrated cooked mashed potato prepared according to U.S. Patent No. 2,780,552 readily reconstitutes to a non-lumpy mashed potato product with either hot or cold liquids, the use of hot liquids has an adverse effect, attributed to cell rupture, upon the texture, contributing to a less mealy mashed potato product. A further object of the present invention is to prepare dehydrated cooked mashed potatoes whose quality, particularly as to texture, is not detracted from significantly upon reconstitution with liquids at high temperatures.

The inclusion of a cooling step between the precooking operation and the final cooking of the potato causes a change in certain characteristics of the potato. The change unexpectedly carries over into the operations which follow the cooking. The result is an improvement in texture of the cooked potato and in the potato products made therefrom. The improvement in texture is so significant that potatoes of very low solids content, which are ordinarily not mealy in texture, when processed into dehydrated products according to the present invention, have a desirable mealiness upon reconstitution to mashed potato. Another advantage of this invention is that the potatoes, after dehydration, can be rehydrated with liquids at high temperatures without materially breaking down the cell structure. A further advantage is that the dehydrated flakes can be made of smaller size, thus giving a higher density product, than was heretofore possible and still give a reconstituted mashed potato of the desired texture.

In the dehydration of cooked mashed (riced) potatoes by known procedures to produce potato granules the mashed potato is held, preferably under refrigeration, for long periods of time prior to dehydration to firm the mash and help minimize cell rupture during further processing. Even with attention to sanitary conditions the mashed potato becomes contaminated with microorganisms, and the microorganisms readily propagate on this medium.

Subsequent processing of the mashed potato to granules is performed under relatively mild temperature conditions and the result is a granule product containing many viable microorganisms. A particular advantage of the present invention is that the cooling step is not only a minimal source of microbial contamination, but that the subsequent cooking step serves to sterilize the potato slices immediately prior to their dehydration.

Another object of this invention is to produce dehydrated mashed potato powder (granules) of better quality, texture, and tolerance for reconstitution at high temperature.

According to the present invention dehydrated, cooked mashed potato products which reconstitute to a superior quality mashed potato are obtained by a process in which the potatoes are peeled, washed and trimmed by any conventional method, the raw potato pieces precooked at 140 to 180° F. for about 10 to 60 minutes, the precooked potatoes remaining as pieces cooled by contact with cold water, for example, by spraying with water, immersion in water, or a combination of spray and immersion, and the cooled potato cooked, as with live steam or boiling water, until soft enough to mash (rice), and then dehydrated. In the production of dehydrated potato flakes we prefer to dry these cooked, mashed (riced) potatoes as described in U.S. Patent No. 2,780,552 and 2,787,553, using a single drum flour type dryer. Potato granules can be prepared by a conventional "add-back" procedure such as that of British Patent 525,043, or by the method of Barker (British Patent 542,125), which eliminates the add-back feature. By our method we would include in either of these processes the steps of precooking and cooling in the same order as described for the manufacture of flakes.

The cooling of the precooked potatoes can be achieved by using a water pressure wash, by holding in a tank containing water, or by a combination of these procedures. In general, the lower the temperature of the water and the longer the period of cooling, the greater the increase in mealiness of the cooked potato product. The extent (degree) of cooling and the duration of cooling can thus be varied according to the type and history of the particular batch of potatoes being processed and the mealiness desired in the product. Even with low-solids potatoes a cooling treatment of 20 minutes immersion in water at about 65° F. or lower (Examples 1, 2, 4 and 8) or a 4-minute wash with tap water, about 65–70° F., plus holding for 16 to 20 minutes in water at the same temperature (Example 3) has sufficed to improve significantly the texture of the cooked potato and the flakes and granules made therefrom. In many geographic areas the inventive process can be practiced quite expeditiously without the use of refrigeration equipment to cool the water.

The practice of our invention is further illustrated by the following examples. In these examples the dehydrated products were appraised by "blue value" determinations and by a panel of taste experts for evaluation as mashed potatoes with especial attention to texture (mealiness). "Blue value" measures the unretrograded amylose and there is an inverse relationship between this value and texture, that is, as "blue value" decreases, mealiness increases.

For convenience and economy the potatoes are sliced to uniform thickness, thereby expediting any heating or cooling step, especially if the potatoes are large size, and facilitates ricing the cooked potato. This step is, however, not considered limiting on the application of the present invention.

In evaluating the effect of the inventive process upon dehydrated potato products the particular choice of liquid used for rehydration; water, milk, or mixture thereof; is not considered a critical factor.

EXAMPLE 1

Maine Russet Burbank potatoes of specific gravity 1.073 were peeled with caustic solution, washed thoroughly, trimmed, sliced (about ⅝ inch thickness) and precooked.

Representative lots of these precooked potatoes were further processed in three different ways. In the usual procedure, serving as a control, potatoes were cooked with live steam at atmospheric pressure until soft enough to mash, riced in a manner which causes a minimum of cell damage, dehydrated on a single drum dryer and cut into ½" flakes. Another lot of the precooked potatoes was washed for 4 minutes with water at about 65° F., then cooked, riced, dehydrated and cut into flakes under the same conditions employed for the control lot. The third lot of precooked potatoes was cooled for 20 minutes in a tank of water at 65° F., then cooked and processed into flakes exactly as for the controls. Some of each of the flake products were evaluated in several ways. Blue values were determined by the method of Mullins et al., "Estimation of Free Starch in Potato Granules and Its Relation to Consistency of Reconstituted Product," Food Technology, vol. IX, No. 8, pp. 393–395 (1955).

Flakes were rehydrated with a liquid consisting of 1 part whole milk and 3 parts water to the desired consistency for taste panel evaluation. In one instance the liquid was about 160° F. temperature when added to the flakes, and for another batch of the same flakes the liquid added was at boiling temperature, about 212° F. Results of the evaluation are presented in Table I.

Table I.—Effects of washing and cooling

| Cooling Treatment After Precook | Blue Value | Taste Panel Judgment | |
|---|---|---|---|
| | | Warm Liquid | Boiling Liquid |
| Control (no cooling) | 130 | Slightly pasty, but acceptable. | Very pasty, not acceptable. |
| Water Wash (65° F.), 4 min. | 98 | Not pasty, acceptable. | Slightly pasty, not acceptable. |
| Holding in Water (65° F.), 20 min. | 74 | Mealy, very acceptable. | Not pasty, acceptable. |

These results show that there is a significant difference in texture between the control product and those of the inventive processes, and that there is a correlation between blue value and taste panel evaluation. The importance of a low blue value is illustrated by the results upon reconstitution of the dehydrated flakes with boiling liquid, when only the flakes having the value of 74 made an acceptable mashed potato product.

EXAMPLE 2

The potatoes were Russet Burbank species, grown in Maine, and had a specific gravity of 1.076. In a process for preparing dehydrated potato flakes, substantially as described in Example 1, the cooling of the precooked potatoes was varied as to temperature of and means of applying the water. Results were evaluated by determination of blue values as described in Example 1, and are shown in Table II.

Table II.—Effect of temperature

| Cooling treatment after precook: | Blue value |
|---|---|
| No cooling (control) | 178 |
| Hold in water (65° F.), 20 min | 93 |
| Hold in water (33° F.), 20 min | 66 |
| Hold in water (33° F.), 20 min., then spray wash (65° F.), 4 min | 45 |

Holding the precooked potato in water at 33° F. gave a lower blue value than when the temperature of the water was 65° F. An even lower blue value was obtained with the alternative of combining a pressure wash with tap water and holding in water.

EXAMPLE 3

This batch of Russet Burbank potatoes from Maine had a specific gravity of 1.070. Dehydrated potato flakes were prepared as in Example 2, varying the cooling procedure as to duration of cooling and type of treatment with water. Cooling procedures employed and corresponding blue values of the flakes obtained are shown in Table III.

Table III.—Effect of time

| Cooling procedure: | Blue value |
|---|---|
| No cooling (control) | 174 |
| Hold in water (70° F.), 20 min | 114 |
| Spray wash (70° F.), 4 min. plus, hold in water (70° F.), 16 min | 88 |
| Hold in water (70° F.), 40 min | 84 |

Extending the cooling time from 20 minutes to 40 minutes reduced the blue value from 114 to 84. Approximately the same result was obtained in half the time, however, when a pressure wash was included as part of the cooling procedure.

Examples 4, 5 and 6 illustrate the application of the invention to potatoes ranging in specific gravity from 1.066 to 1.095.

EXAMPLE 4

Potatoes of very low solids, Pennsylvania Katahdins with specific gravity of 1.066, were peeled, washed, trimmed, sliced and precooked. They were apportioned into four lots. One lot was cooked and processed into flakes essentially as described in Example 1. The other three lots of precooked potatoes were cooled in water at about 65° F. for 7, 14 and 20 minutes, respectively, prior to cooking and processing into flakes. The results of tests on these products are presented in Table IV.

Table IV.—*Effect of precook and precook-plus-cooling on low-solids potatoes*

| Cooling Treatment After Precook | Blue Value | Taste Panel |
|---|---|---|
| No cooling (control) | 200 | Pasty, unacceptable. |
| Hold in water, 7 min | 188 | Do. |
| Hold in water, 14 min | 171 | Do. |
| Hold in water, 20 min | 92 | Not pasty, acceptable. |

The above example shows that with a very low-solids potato a cooling step following precook is necessary in order to obtain an acceptable product when the flakes are reconstituted and that with these particular potatoes a cooling time of more than 14 minutes was required.

EXAMPLE 5

The procedures of Example 4 were followed in preparing dehydrated potato flakes from high-solids potatoes, Idaho Russets of specific gravity 1.095. Results are given in Table V.

Table V.—*Effect of precook and precook-plus-cooling on high-solids potatoes*

Cooling treatment after precook:  Blue value
    No cooling (control) _____ 142
    Hold in water, 7 min_____ 113
    Hold in water, 14 min_____ 98
    Hold in water, 20 min_____ 100

All of the products of Example 5 were judged to have acceptable texture when submitted to a trained taste panel. The lowering of blue value due to cooling was less pronounced than with low solids potatoes of Example 4, and a cooling time of 14 minutes was sufficient to achieve maximum improvement.

EXAMPLE 6

This example varied from Example 4 in that the potatoes were Maine-grown Russet Burbank of specific gravity 1.078 and the cooling step after the precook was either a 20-minute spray with, or immersion in, water at 47° F.

Table VI.—*Effect of precook and precook-plus-cooling at 47° F. on moderately low-solids potatoes*

Cooling treatment after precook:  Blue value
    No cooling (control) _____ 87
    Hold in water, 20 min_____ 57
    Spray with water, 20 min_____ 59

In this example it is shown that products of the same low blue value were obtained by cooling either by immersion or by spraying for 20 minutes.

The foregoing examples have shown the benefits of cooling on blue value and texture of standard flakes of about ½″ square. In the following example the effect of cooling on the tolerance for breaking to smaller size is shown.

EXAMPLE 7

"High-solids" Russet Burbank potatoes, specific gravity 1.090, grown in Idaho, were peeled, washed, trimmed and precooked. A control lot was steam cooked until soft enough to mash, then riced, dehydrated on a single drum dryer, cut into ½″ flakes, and screened to remove oversize and undersize flakes. About half the ½″ flakes were recut and rescreened to obtain ³⁄₁₆″ flakes.

Other lots of precooked potatoes were cooled as shown in Table VII then processed into ½″ and ³⁄₁₆″ flakes as described for the controls. The flakes obtained from the different procedures were evaluated as to "blue value" and as to quality (texture) of reconstituted mashed potato when rehydrated with liquid (1 part milk to 3 parts water) at about 160° F. and at about 212° F. Results are shown in Table VII.

Table VII.—*Effect of cooling and flake size*

| Cooling Treatment After Precook | ½″ Flake (Density 13#/cu. ft.) | | | ³⁄₁₆″ Flake (Density 27#/cu. ft.) | |
|---|---|---|---|---|---|
| | Blue Value | Rehydration Liquid | | Blue Value | Rehydrated with Warm Liquid |
| | | Warm | Hot | | |
| No cooling (control) | 105 | [1]1 | [1]2 | 216 | [1]3 |
| Hold in water (74° F.), 20 min | 49 | 1 | 1 | 75 | 1 |
| Hold in water (33° F.), 20 min | 35 | 1 | 1 | 67 | 1 |
| Wash in water (74° F.), 20 min | 37 | 1 | 1 | 73 | 1 |
| Wash in water (33° F.), 20 min | 35 | 1 | 1 | 67 | 1 |

[1] Ratings: 1—excellent mealy texture; 2—significantly less mealy; 3—unacceptable (pasty).

The results show that with the inclusion of a cooling step in the process the ½″ flakes can be reconstituted at higher temperatures or that the density of the flake product can be doubled and the ³⁄₁₆″ flakes reconstituted with warm liquids to give mashed potato of excellent texture.

Application of the present invention to preparing potato granules which reconstitute to mashed potato of improved texture is illustrated in the following example.

EXAMPLE 8

Dehydrated potato granules were made from Russet Burbank potatoes of intermediate specific gravity (1.083) and from Katahdin potatoes of low specific gravity (1.066) by a simulated "add-back" process (Studies on Dehydrated Potato Granules, A. M. Cooley, D. E. Severson, D. E. Peightal and J. R. Wagner, Food Technology, 1954, vol. VIII, No. 5, pages 263–269). Potato flakes and fresh mashed potatoes were mixed in the proportions necessary to give a moist mix of about 35% moisture content. The mix was cooled to room temperature and was then mixed in a planetary type mixer for 15 minutes. It was allowed to stand for 45 minutes and then mixed again for 15 minutes. The mix was then sieved through a 20-mesh screen and the portion passing through the screen was dried in a tray dryer for 24 hours with an air temperature of 80–120° F. The dried material was screened and the portion passing through a 65-mesh screen was collected as final product.

Mashed potato and dehydrated flakes were prepared from each variety of potato by procedures similar to those described in preceding examples. The potatoes were peeled, trimmed and sliced into slabs about ⅝″ thick. The slices were divided into 3 lots. One lot was cooked directly in steam and then mashed; the second lot was precooked for 20 minutes in water at 160° F. and then cooked in steam; the third lot was precooked in water at 160° F. for 20 minutes, cooled in cold water at about 50° F. for 20 minutes and then finally cooked in steam. From each lot of each variety, potato granules were made by the procedure described above. The free soluble starch content of each product was determined by the blue value method. The results of these determinations are tabulated below.

*Blue values*

| Treatment | Russet Burbank | Katahdin |
|---|---|---|
| Steam cook only (1) | 280 | 320 |
| Precook 160° F.+steam cook (2) | 146 | 242 |
| Precook 160° F., cool+steam cook (3) | 59 | 61 |

It is shown that for each variety the amount of free soluble starch is least in the granules made from precooked and cooled slices (treatment 3), most in those from the untreated slices (treatment 1) and intermediate in the granules from the precooked slices (treatment 2). The dehydrated granules were reconstituted with a mixture of hot water and milk and were served to a taste panel for judgment of texture. The panel was asked to rate them in the order of least to most pastiness and to comment on their acceptability as mashed potatoes. The rating was 3, 2, 1 in each case. Of the Russet Burbank, treatment 1 was declared unacceptable; treatment 2, good; and treatment 3, excellent. Of the Katahdins, treatments 1 and 2 were declared unacceptable, and treatment 3, excellent. Those judged unacceptable were declared so because they were too pasty, i.e., because they contained too much free soluble starch, as shown also by their high "blue values."

We claim:

A process for producing dehydrated potatoes comprising precooking raw potato pieces at a temperature of about 140 to 180° F. for about 10 to 60 minutes whereby the potato pieces remain, cooling the precooked potato pieces by contact with cold water at a temperature not over about 70° F. for at least about 14 minutes, cooking the cooled potato pieces until soft enough to mash, mashing the cooked potatoes, and dehydrating the cooked mashed potatoes, the water cooling of the precooked potato pieces acting to increase the mealiness of rehydrated mashed potatoes prepared from the dehydrated cooked mashed potatoes.

References Cited in the file of this patent

UNITED STATES PATENTS

| | | |
|---|---|---|
| 2,742,847 | Miers | Apr. 24, 1956 |
| 2,787,553 | Cording et al. | Apr. 2, 1957 |

FOREIGN PATENTS

| | | |
|---|---|---|
| 525,043 | Great Britain | Apr. 29, 1940 |
| 542,125 | Great Britain | Dec. 29, 1941 |

OTHER REFERENCES

Advances in Food Research, vol. 6, 1955, pp. 237, 238.